… … …

United States Patent Office 2,706,188
Patented Apr. 12, 1955

2,706,188

PRODUCTION OF RESIN COATED PARTICLE MATERIAL

Chester W. Fitko and John S. Horn, Chicago, Ill.

No Drawing. Application July 5, 1952,
Serial No. 297,396

8 Claims. (Cl. 260—38)

This invention relates to the production of sand or the like discrete particle material in the form of dry, free-flowing particles, each provided with a nontacky coating of potentially thermosetting phenolic resin.

The invention is particularly concerned with the production of a sand precoated with a resin for use in the "shell molding" process.

As is now well known, this "shell molding" process comprises the production of sand mold sections for the casting of metals, by depositing a laterally confined dry mixture of sand and powdered resin, and when required powdered resin curing or accelerating agent, against the face of a heated metal pattern. Heat transfer through the pattern melts and fuses the resin and on cooling bonds the sand particles to a crust, one face thereof forming a negative reproduction of the pattern. The thickness of this mold section is dependent on the degree to which the pattern is heated and the heat transferred therefrom to the overlying layer of sand, and since this is progressively and upwardly and outwardly limited, but adequate, a relatively thin shell of from about one-quarter to about one-half inch in thickness results. Unbonded overlying sand mixture may be removed for subsequent use. This preliminary shell or crust is later subjected to further heat to fully cure the resin.

As indicated, such process does not employ nor require pressure, the only pressure employed being a negligible minimum developed by a small excess over the minimum sand mixture which bonds in the process; or that developed in throwing the sand mixture against the heated pattern when employing a pivotally supported or other container having the sand mixture in the bottom and with the top closed by the pattern, and then inverting the assembly so that sand mixture is thrown or dropped several inches onto the face of, for example, a metallic pattern which has been preheated to a temperature of about 400° F. to 500° F. Less than a minute is required to melt and fuse the resin to form a unitary crust.

After the excess sand, which has not been reached by heat in amount to fuse the resin, is removed, this pattern and its overlying crust is then further heated by any suitable means, such as for example in an oven, to cure the resin to the thermoset or infusible condition, after which it is separated from the pattern in the form of a rigid shell. These shells are employed by assembling a pair of mold halves, placing them in a vessel, and backing them up with steel shot or other suitable supporting means to hold them firmly together and to resist pressure of the molten metal and distortion thereby when pouring.

The employment of such dry mixture of sand, powdered resin, and generally a powdered curing agent, such as hexamethylenetetramine, is undesirable for several reasons. One important objection is that such dry mixture presents a dust hazard in handling which is injurious to health, and an explosion hazard which is dangerous to plant and personnel. Another is that due to the difference in densities of the materials, they tend to separate from each other in handling to result in a structure of nonuniform character and strength when subjected to the indicated heat treatments in the production of shell molds. Another undesirable factor is that in forming the shell molds an appreciable or disproportionate amount of resin settles at the interface of the mold and pattern to form a resin skin. In use of the resultant shell mold this prevents uniform dissipation of volatiles through the mold body and results in undesirable blow holes. Further, the use of such a resin-sand mix is not adapted for use in the conventional foundry equipment where air conveyor or conveyor belts are conventionally employed for handling molding sand, since such means causes separation and stratification of the dry mix components. The use of such dry particle mix also entails the employment of an unduly high proportion of the costly resin required to bring about satisfactory strength and bonding of the sand particles.

It is therefore an object of the present invention to provide a sand precoated with the resin adapted for use in the shell molding process, whereby dust and explosion hazards of a powdered mix are eliminated; separation and stratification of the components avoided; ability to use conventional foundry sand handling equipment is retained; and shell molds of more uniform character and better physical properties are obtainable, all with a saving in the amount of resin required.

The advantages and objects of the present invention are accomplished by providing each sand particle with an individual, dry, nontacky coating of phenol-aldehyde resin of a potentially thermosetting character, and for this purpose it is particularly advantageous to employ the liquid resin material more particularly described and claimed in the copending application of Chester W. Fitko, Serial No. 297,394 filed of even date herewith. More specifically, said resin composition is composed of an acid-catalyzed phenol-formaldehyde resin which is normally permanently fusible; is normally liquid, i. e. in liquid condition as formed and employed; and has a resin solids content of from about 70 to about 80% by weight. This resin is formed by reacting phenol and formaldehyde in the molar ratios of from about 0.5 to not more than 0.725 mol of formaldehyde to one mol of phenol in the presence of a minimum requisite amount of acid catalyst, such as from about 0.4 to about 0.8% of hydrochloric acid by weight of the phenol, or more when employing weaker acids such as sulfuric or oxalic acids. These are reacted for a period of about four hours at temperatures controllably increased over said period from 35° C. to 60° C., after which a liquid resin reaction product layer is separated, neutralized, washed and dehydrated to a resin solids content of approximately 70 to 80% by weight.

In carrying out the coating operation, washed and dried sand, preheated to a temperature of about 100° C., is placed in a suitable mixing vessel, together with about 2–4% by weight of the aforesaid resin, and from about 8% to about 20% of powdered hexamethylenetetramine by weight of the resin. The components are heated and mixed until the hexamethylenetetramine blends with the liquid resin and the resin coats each of the sand grains, and heating is terminated and the mix cooled by adding water thereto when the melting range of the resin on the sand reaches 80–102° C. Heating may be accomplished by means of heated air directed through the vessel, or by employing a vessel having a steam jacket. To bring the resin to the indicated melting range on the sand, heating the mix to a temperature of 100° C. for about 5 to 10 minutes is adequate, with good agitation. During this heating the volatiles are removed from the initially liquid resin, and although without the presence of the hexamethylenetetramine, it would have advanced in the heating period to a solid of 60–65° C. melting range, here partial reaction with the hexamethylenetetramine takes place.

Control of the character of the resin on the sand is accomplished by terminating heating, and with positive cooling, when the softening point reaches 80–102° C. At this point the resin on cooling provides the sand particles with a solid, nontacky coating, and upon further drying to eliminate the added cooling water, together with any crushing that may be necessary to break up particle aggregates, there results a free flowing, storage stable, discrete particle product.

Control of the melting point or range of the resin on the sand and limitation thereof to the indicated degree limits the extent of reaction between the resin and hexamethylenetetramine to a condition where there is some reaction between the two as indicated by the advance in melting point, but yet where some lies dormant or "locked in," so that the resin coating may be said to be in a potentially thermosetting condition, since all necessary hexamethylenetetramine for such purpose on further heating is present. Arresting the reaction at this point leaves the resin in a condition of desirably good flow requisite for obtaining good bonding without pressure and maximum tensile of the bonded sand particles, when they are employed in the production of shell molds by the means previously described.

This desirably good flow is obtained by the practice of the coating process described, as distinguished from the prior practice of directly employing a dry mix, or as distinguished from the employment of an initially solid resin dissolved in a solvent even though it may be of the class which is made with a molar deficiency of formaldehyde, or the employment of the latter solution or even the liquid resin of the present invention by coating the resin therewith and drying, and subsequently mixing with powdered hexamethylenetetramine. All of these distinguished processes give poorer flow properties, and lower strength properties than those of the present invention for an equal amount of resin.

Of particular importance is the advantage that by means of the precoated sand of the present invention the same mold strength may be ultimately obtained when employing 3% of resin by weight of the sand as is obtained when using 6% by weight in the prior dry mix technique.

It will be understood, of course, that sands of different sources, and depending on their impurities, will require slightly different proportions of resin to sand. However, by employing a washed and dried AFS silica sand, with a 100 fineness number a satisfactory product was formed with 3% of the indicated resin by weight, combined with 15% hexamethylenetetramine by weight of the resin, heated and mixed for ten minutes at 100° C. in a mixer using heated air passing through the mix with water cooling of the resin when it reached a melting point of about 90° C.

Although the present invention has been particularly described with reference to the coating of sand adapted for use in the shell molding process, it will be understood that other particle material may likewise be coated with the indicated resin-hexamethylenetetramine composition to provide storage-stable particles with potentially thermosetting individual resin coatings. Although no pressure is required and as little as 2–4% of resin by weight of the particle material is adequate in the case of sand for use in the shell molding process, greater proportions of resin or positive pressure may be desirable with other material or for other uses. Thus, in any case, where increased density is desired some pressure may be employed, although this pressure will be relatively lower than would have been the case were other resins employed. For the like purpose, and particularly when the particles are larger than sand, it may be desirable to employ a larger proportion of resin.

Sand coated in accordance with the present invention is also highly suitable for the production of foundry cores, with or without pressure, as desired or required.

We claim as our invention:

1. The method of providing sand grains with individual coatings of a solid nontacky potentially thermosetting resin, which comprises mixing said sand grains with a normally liquid acid-catalyzed thermoplastic phenol-formaldehyde resin and hexamethylenetetramine in an amount adequate to convert said resin to a thermosetting condition, heating said mixture while continuing the mixing to evaporate volatiles from said resin and to convert it to a solid condition and to partially react said hexamethylenetramine therewith, and terminating said heating when the resin has advanced to the condition of a solid melting in the range of from about 80° C. to about 102° C., and recovering the coated sand grains.

2. The method of coating sand grains with individual coatings of a solid nontacky potentially thermosetting resin, which comprises preheating said sand to a temperature of about 100° C. and mixing it with a normally liquid acid-catalyzed thermoplastic phenol-formaldehyde resin and hexamethylenetetramine in an amount adequate to convert said resin to a thermosetting condition, heating said mixture while continuing the mixing to evaporate water, phenol and other volatiles from said resin and to convert it to a normally solid condition and to partially react said hexamethylenetetramine therewith, and terminating said heating when the melting point of the resin has advanced to a range of from about 80° C. to about 102° C., cooling the material to solidify the resin, separating aggregates therein to individual coated particles, and recovering a mass of free-flowing individually coated sand grains.

3. The method of providing sand grains with individual coatings of solidified, nontacky potentially thermosetting phenolic resin, which comprises mixing washed and dried sand preheated to a temperature of about 100° C. with a normally liquid and thermoplastic phenol-formaldehyde resin together with hexamethylenetetramine to convert said resin to a thermosetting condition, heating the mixture to evaporate volatilizable material content thereof and to convert it by partial reaction with the hexamethylenetetramine to a normally solid condition while continuing the mixing to coat the grains and to prevent them from aggregating, terminating said heating when the resin has advanced to a melting range of from about 80° C. to about 102° C., and cooling the mix to solidify the resin on the sand, and recovering the latter in the form of resin coated individual grains.

4. The process of claim 1, wherein the normally liquid resin is composed of an acid-catalyzed reaction product in the proportion of 1 mol of phenol to from about 0.5 to not more than 0.725 mols of formaldehyde.

5. The process of claim 1, wherein the normally liquid resin has a resin solids content of from about 70% to about 80% by weight.

6. The process of claim 1, wherein the normally liquid resin when dried by heating at a temperature of about 100° C. for a period of 5 to 10 minutes is a thermoplastic solid having a melting point in the range of from about 60° C. to about 65° C.

7. Discrete free-flowing particles of sand individually coated with a solid nontacky layer of a potentially thermosetting resin composed of acid-catalyzed normally liquid and thermoplastic phenolformaldehyde resin including and partially reacted with hexamethylenetetramine the resin coating on the particle material having a melting point in the range of from about 80° C. to about 102° C.

8. A dustless, free-flowing, nontacky sand consisting of sand particles wherein each particle of sand is separated from adjacent particles and wherein each sand particle is coated with about 2–4% by weight of a film of a potentially thermosetting resin nontacky at normal room temperatures composed of acid-catalyzed thermoplastic phenolformaldehyde resin including and partially reacted with hexamethylenetetramine and melting in the range of from about 80° C. to about 102° C. and substantially completely enveloping each sand particle, said coated sand particles being convertible into a coalesced mass by the application of heat sufficient to melt the resin coating with substantially no pressure and to coalesce the films to form a continuous resin matrix wherein the sand particles are substantially uniformly dispersed to form a rigid structure.

References Cited in the file of this patent

UNITED STATES PATENTS

| Number | Name | Date |
|---|---|---|
| 1,090,439 | Aylsworth | Mar. 17, 1914 |
| 1,508,124 | Richardson | Sept. 2, 1924 |
| 1,884,747 | Knapp | Oct. 25, 1932 |
| 2,201,321 | Robie | May 21, 1940 |
| 2,476,933 | Wallace | July 19, 1949 |
| 2,491,006 | Grube | Dec. 13, 1949 |
| 2,517,815 | Weston | Aug. 8, 1950 |
| 2,521,614 | Valyi | Sept. 5, 1950 |

OTHER REFERENCES

"The 'C' Process of Making Molds and Cones," by Wm. McCulloch, FIAT Final Report 1168, pages 1–4.